United States Patent
Kato

[11] Patent Number: 6,146,122
[45] Date of Patent: Nov. 14, 2000

[54] MOLD FOR MOLDING COMPOSITE ARTICLE

[75] Inventor: Tomohisa Kato, Utsunomiya, Japan

[73] Assignee: Fuji Jukogyo Kabushiki Kaisha, Tokyo, Japan

[21] Appl. No.: 09/063,353

[22] Filed: Apr. 21, 1998

[30] Foreign Application Priority Data

Apr. 25, 1997 [JP] Japan .................................. 9-121470

[51] Int. Cl.[7] .......................... B29C 43/04; B29C 43/14; B29C 51/38; B29C 70/34; B29C 70/46
[52] U.S. Cl. ...................... 425/125; 425/129.1; 425/399; 425/412; 425/520; 264/257; 264/258; 264/324
[58] Field of Search ................................... 425/394, 395, 425/398, 423, 519, 520, DIG. 10, 125, 412, 193, 195, DIG. 44, 399, 129.1

[56] References Cited

U.S. PATENT DOCUMENTS

| | | | |
|---|---|---|---|
| 2,367,822 | 1/1945 | Brown | 425/394 |
| 2,559,860 | 7/1951 | Fay | 425/125 |
| 2,559,861 | 7/1951 | Fay | 425/125 |
| 2,581,222 | 1/1952 | Varner | 264/324 |
| 2,760,231 | 8/1956 | Clair | 425/398 |
| 4,149,841 | 4/1979 | Patterson | 425/398 |
| 4,338,070 | 7/1982 | Nava | 425/112 |
| 4,576,566 | 3/1986 | Hain | 425/400 |
| 4,735,758 | 4/1988 | Larsson et al. | 264/324 |
| 4,961,700 | 10/1990 | Dunbar | 264/257 |
| 5,164,140 | 11/1992 | Siano | 425/398 |
| 5,203,940 | 4/1993 | Krone | 425/423 |
| 5,238,640 | 8/1993 | Masui et al. | 425/125 |
| 5,393,479 | 2/1995 | Nadeau | 264/257 |
| 5,882,462 | 3/1999 | Donecker et al. | 264/257 |

*Primary Examiner*—Jan H. Silbaugh
*Assistant Examiner*—Michael I. Poe
*Attorney, Agent, or Firm*—Smith, Gambrell & Russell, LLP

[57] ABSTRACT

A mold for molding a composite article has an upper half mold, a lower half mold having a base and a core mounted on the base, and a pressure plate. A plurality of holes are formed in the upper surface of the pressure plate, and springs are placed in the holes. A laminated sheet formed by laminating woven fabrics is placed on the core, and the pressure plate is put on the laminated sheet so as to press a part of the laminated sheet against the core by its weight without creasing the part of the laminated sheet. When joined to the lower mold, the upper mold compresses the springs to compress the part of the laminated sheet firmly between the pressure plate and the core, and then bends the laminated sheet along the side surfaces of the core so that the laminated sheet is shaped in a predetermined shape.

5 Claims, 7 Drawing Sheets

PRIOR ART

FIG. 7

PRIOR ART

FIG. 8

MOLD FOR MOLDING COMPOSITE ARTICLE

BACKGROUND OF THE INVENTION

1. Field of the Invention

The present invention relates to a mold employed in a composite article molding apparatus for molding a composite article, such as a fiber-reinforced plastic article, by a resin transfer molding method (RTM method) which places a woven fabric in a mold, injects a resin into the mold, and heats the resin for hardening.

2. Description of the Related Art

Various composite articles have become used in all industries including the aircraft industry and the automobile industry in recent years and demand for composite articles is progressively increasing. On the other hand, high manufacturing costs of composite articles are a serious problem obstructing the widespread use of composite articles. Active research and development activities have been made for the reduction of the manufacturing costs of composite articles, and a RTM method has come into wide use in recent years.

Figure 7:
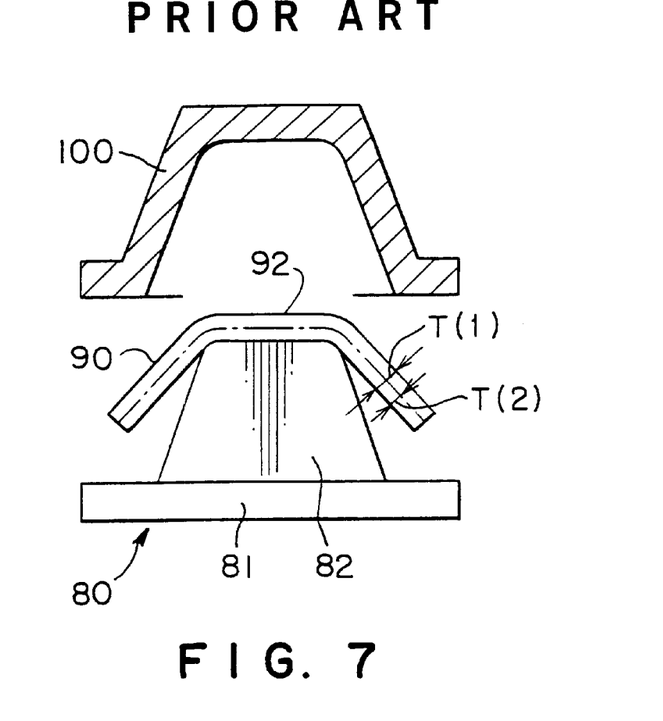
FIG. 7 is a cross-sectional view of a mold employed in a prior art composite article molding apparatus.

A composite article molding method disclosed in JP-B No. 5-14834 bends a prepreg sheet formed by impregnating a woven fabrics with a resin to produce a composite article. FIG. 7 shows a mold employed in a known composite article molding apparatus which bends a flat woven fabrics to produce a composite article by the RTM method. As shown in FIG. 7, the mold consists of a lower half mold 80 and an upper half mold 100. The lower half mold 80 is formed by placing a core 82 on a base 81. A woven fabrics 90 not impregnated with a resin is placed on the core 82, and the upper half mold 100 is joined to the lower half mold 80 to bend the woven fabrics 90 in the shape of a channel. Then, a resin is injected into the mold, and the resin is heated for hardening to obtain a composite article, namely, a fiber-reinforced plastic article.

Figure 8:
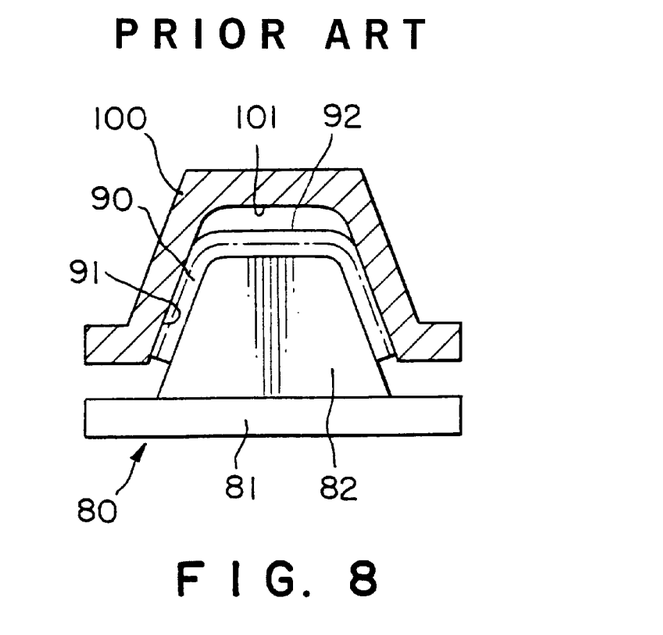
FIG. 8 is a cross-sectional view of the mold shown in FIG. 7 in a molding process.

In producing the composite article by bending the woven fabrics 90 impregnated with the resin by the RTM method using the known mold shown in FIG. 7, when the upper half mold 100 is joined to the lower half mold 80, the upper half mold 100 bends the woven fabrics 90 so as to follow the shape of the core 82, and compresses the woven fabrics 90 so that the original thickness T(1) of the woven fabrics 90 is reduced to a predetermined thickness T(2). As shown in FIG. 8, flange parts 91 of the woven fabrics 90 are compressed between the upper half mold 100 and the core 82 before the upper wall 101 of the upper half mold 100 comes into contact with a web part 92 of the woven fabrics 90. Therefore the woven fabrics 90 is unable to slide along the side surfaces of the core 82 when the upper half mold 100 is further lowered to compress the web part 92 of the woven fabrics 90 so that its thickness T(1) is reduced to the thickness T(2). Consequently, the web part 92 is creased, the strength of the composite article is reduced or the web part 92 cannot be formed in the predetermined thickness T(2).

SUMMARY OF THE INVENTION

The present invention has been made to solve such a problem in the prior art and it is therefore an object of the present invention to provide a mold for a composite article molding apparatus, capable of molding a fiber-reinforced plastic article of a satisfactory quality not having any creases by the RTM method.

According to the invention, a mold for molding a composite article comprising a lower half mold having a base and a core mounted on the base a pressure plate placed on a laminated woven fabrics mounted on the core of the lower half mold, having elastic means on an upper surface of the pressure plate for pressing the laminated woven fabrics against the core; and an upper half mold capable of shaping the laminated woven fabrics into a predetermined shape in cooperation with the core of the lower half mold and the pressure plate by compressing the elastic means of the pressure plate to compress the laminated woven fabrics between the pressure plate and the core of the lower half mold.

According to the one feature of the invention, the elastic means comprises a plurality of elastic members arranged on the upper surface of the pressure plate.

According to the another feature of the invention, the elastic means includes a spring.

According to the another feature of the invention, the elastic means includes a hole formed in the upper surface of the pressure plate, a guide pin set upright at a center of a bottom surface of the hole, and a spring placed in the hole and surrounding the guide pin; and the upper half mold is provided with a recess in a portion corresponding to the guide pin to receive the guide pin therein.

According to the another feature of the invention, the upper half mold comprises an outer section and an inner section divided from the outer section through a dividing interface; and the inner section is divided above the pressure plate.

According to the another feature of the invention, the core has side surfaces perpendicular to an upper surface of the base, and the inner section of the upper half mold has an inner surface perpendicular to the upper surface of the base and corresponding to the side surfaces of the core, respectively.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
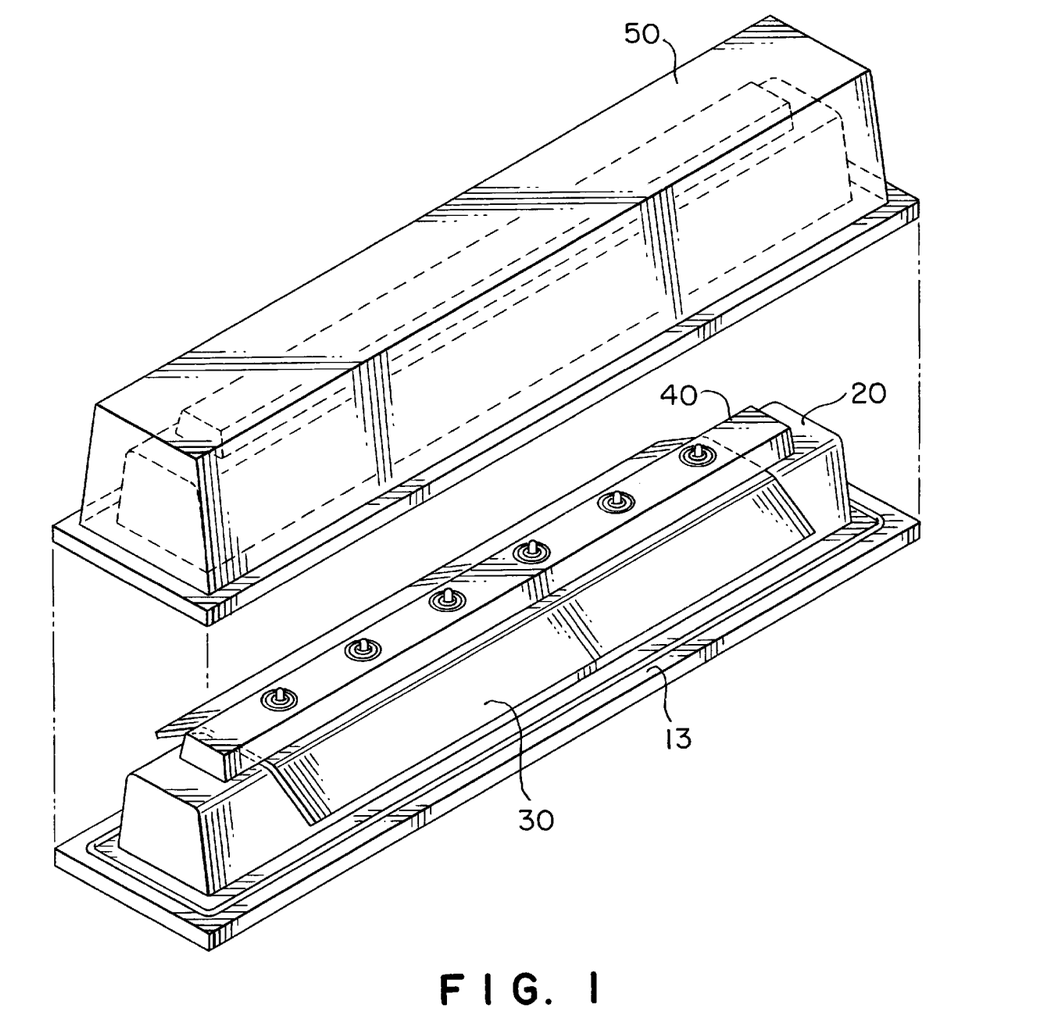
FIG. 1 is a perspective view of a mold in a first embodiment according to the present invention.
Figure 2:
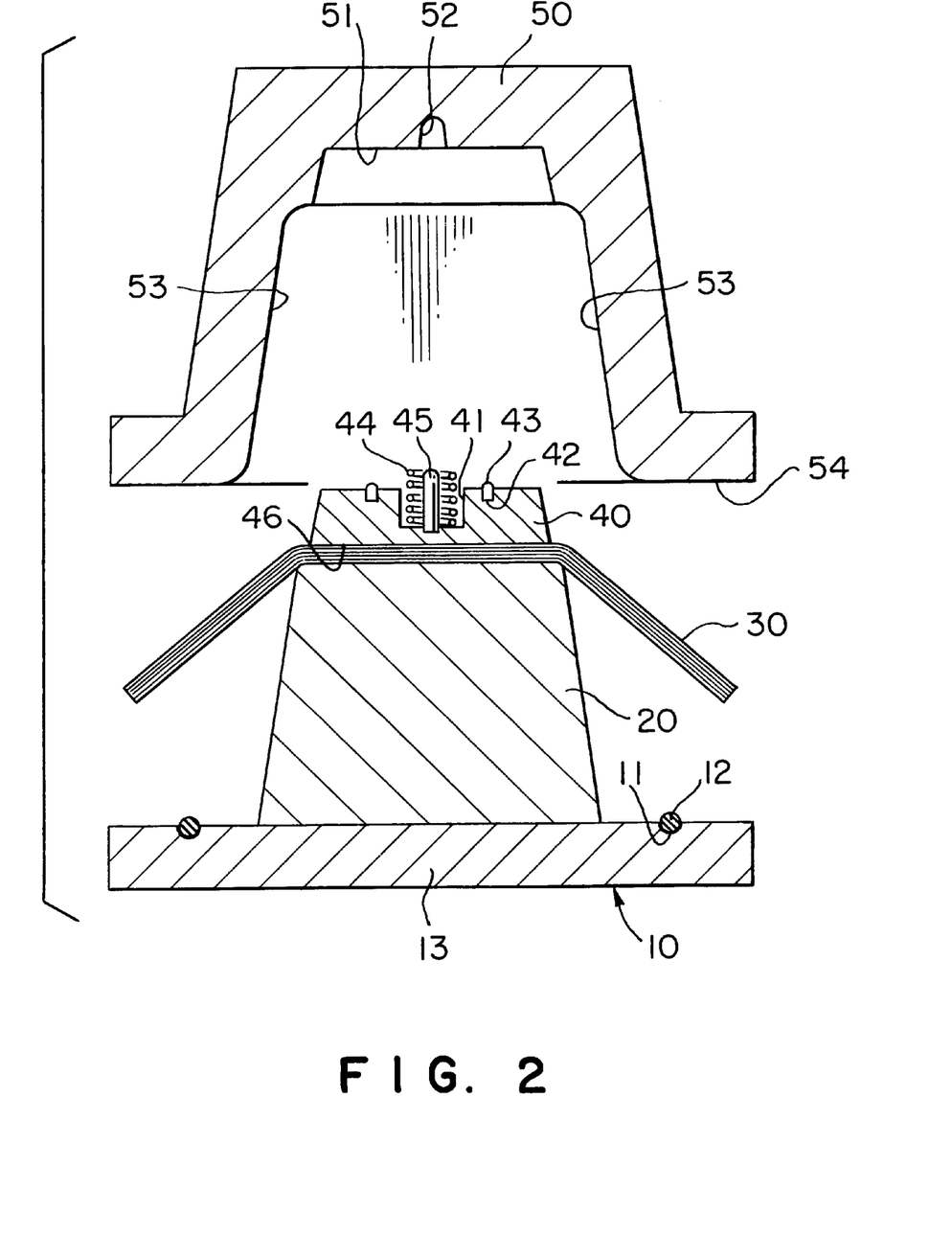
FIG. 2 is a cross-sectional view of the mold shown in FIG. 1.

Referring to FIG. 1, a mold in a first embodiment according to the present invention comprises a lower half mold 10, a pressure plate 40 and an upper half mold 50. As shown in FIG. 2, the lower half mold 10 has a base 13 having the shape of a flat plate, and a core 20 having a shape corresponding to the shape of a composite article to be molded and mounted on the base 13. An endless groove 11 is formed in the upper surface of the base 13 so as to surround the core 20, and a sealing member 12 of silicone rubber is fitted in the groove 11.

The pressure plate 40 to be placed on a laminated sheet 30 laminated woven fabrics not impregnated with a resin, which is formed by laminating woven fabrics, is provided in its upper surface with a plurality of holes 41 in a longitudinal arrangement as shown in FIG. 1. Circular grooves 42 are formed in the upper surface of the pressure plate 40 so as to surround the holes 41 and 0 rings 43 are fitted in the grooves 42, respectively. The pressure plate 40 is made of a metal having a large specific gravity and having a small coefficient of thermal expansion, such as a steel. A guide pin 45 is set upright at the center of the bottom surface of each hole 41, and a spring 44 is placed in the hole 41 and surrounding the guide pin 45. The spring 44 has a length greater than the depth of the hole 41 and projects upward from the upper surface of the pressure plate 40 in a free state. In this embodiment, the width of the lower surface 46 of the pressure plate 40 is substantially equal to the width of the flat upper surface of the core 20. The widthwise corners of the lower surface 46 of the pressure plate 40 may be rounded and may be extended to positions corresponding to the rounded edges of the core 20.

The upper half mold 50 has a substantially U-shaped cross section, and has an upper wall 51, opposite side walls 53, and flanges 54 respectively extending from the lower ends of the side walls 53. When the mold is closed, the inner surface of the upper wall 51 of the upper half mold 50 comes into close contact with the upper surface of the pressure plate 40. Recesses 52 are formed in the lower surface of the upper wall 51 at positions respectively corresponding to the guide pins 45. The side walls 53 has inclined inner surfaces corresponding to the shape of a composite article to be molded. When the mold is closed, a space conforming to the shape of the composite article is formed between the inner surface of the upper half mold 50 and the surface of the core 20 to shape the laminated sheet 30 into a predetermined shape.

Figure 3:
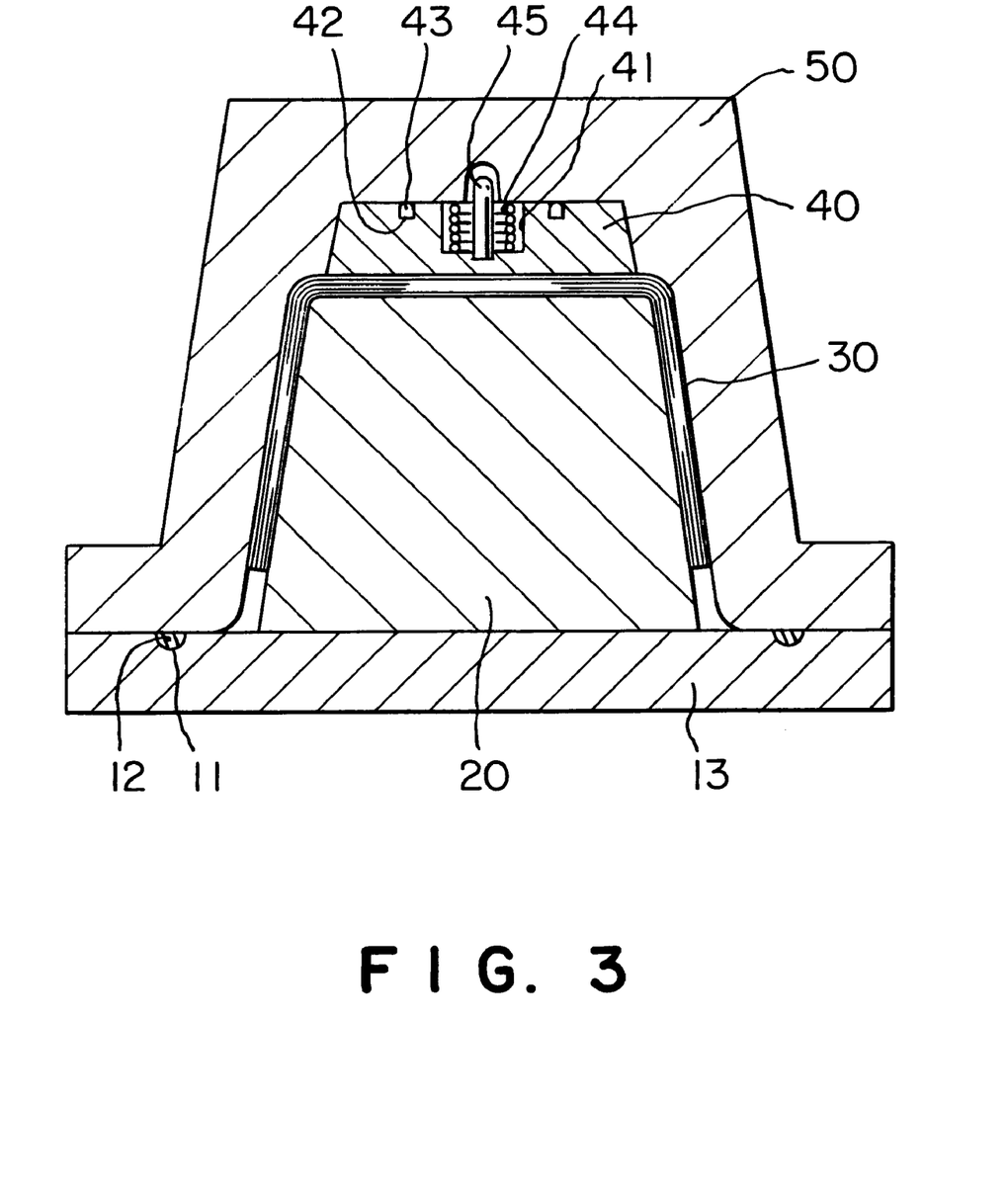
FIG. 3 is a cross-sectional view of the mold shown in FIG. 1 in a closed state.
Figure 4:
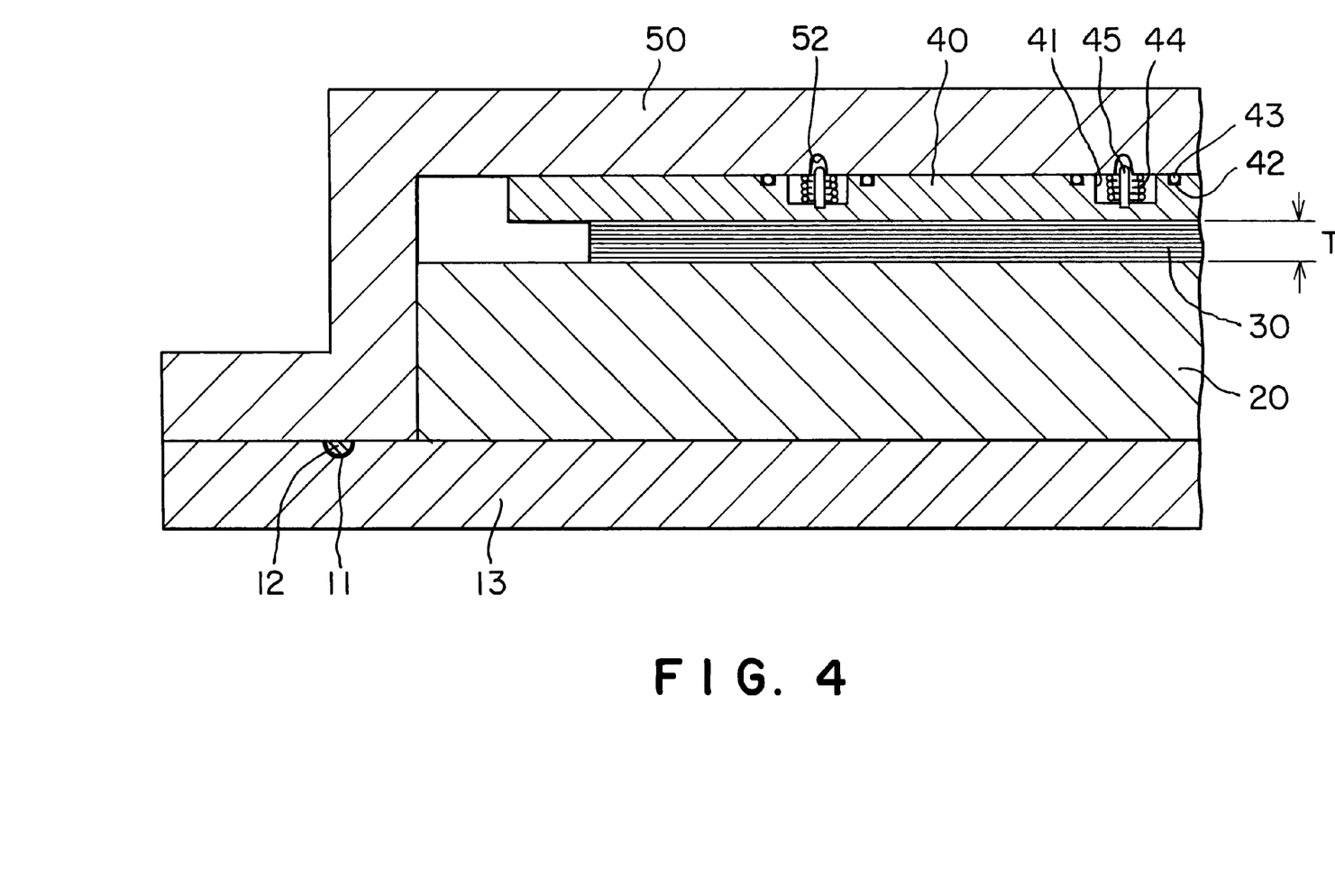
FIG. 4 is a longitudinal sectional view of the mold shown in FIG. 1 in a closed state.

The laminated sheet 30 is placed on the upper surface of the core 20, the pressure plate 40 is placed on the laminated sheet 30 to hold the laminated sheet 30 between the core 20 and the pressure plate 40. The laminated sheet 30 is compressed firmly between the core 20 and the pressure plate 40 by the weight of the pressure plate 40 without being creased. Then, the upper half mold 50 is lowered toward the core 20 and the pressure plate 40 to close the mold. As the upper half mold 50 is lowered, the side walls 53 of the upper half mold 50 bend the laminated sheet 30 gradually so that flange parts of the laminated sheet 30 extends along the side surfaces of the core 20 to be formed into the shape of a channel. As the upper half mold 50 is lowered further, the upper wall 51 of the upper half mold 50 compresses the springs 44 to compress a web part of the laminated sheet 30, namely, a part of the laminated sheet 30 on the upper surface of the core 20, into a predetermined thickness by the resilience of the springs 44. The dimensions of the upper half mold 50, the springs 44 and the pressure plate 40 are determined so that the upper wall 51 of the upper half mold 50 compresses the springs 44 before the side walls 53 of the upper half mold 50 press the flange parts of the laminated sheet 30 firmly against the side surfaces of the core 20. Therefore, when compressing the web part of the laminated sheet 30 into the predetermined thickness, the web part is able to extend toward the flange parts and hence the web part is prevented from being creased. The flange parts of the laminated sheet 30 are compressed firmly against the side surfaces of the core 20 by the wedge action of the inclined inner surfaces of the side walls 53 into a predetermined thickness. The flanges 54 is brought into close contact with the upper surface of the base 13 of the lower half mold 10 to close the mold as shown in FIGS. 3 and 4, and then the lower half mold 10 and the upper half mold 50 are fastened together with bolts, not shown.

Figure 5:
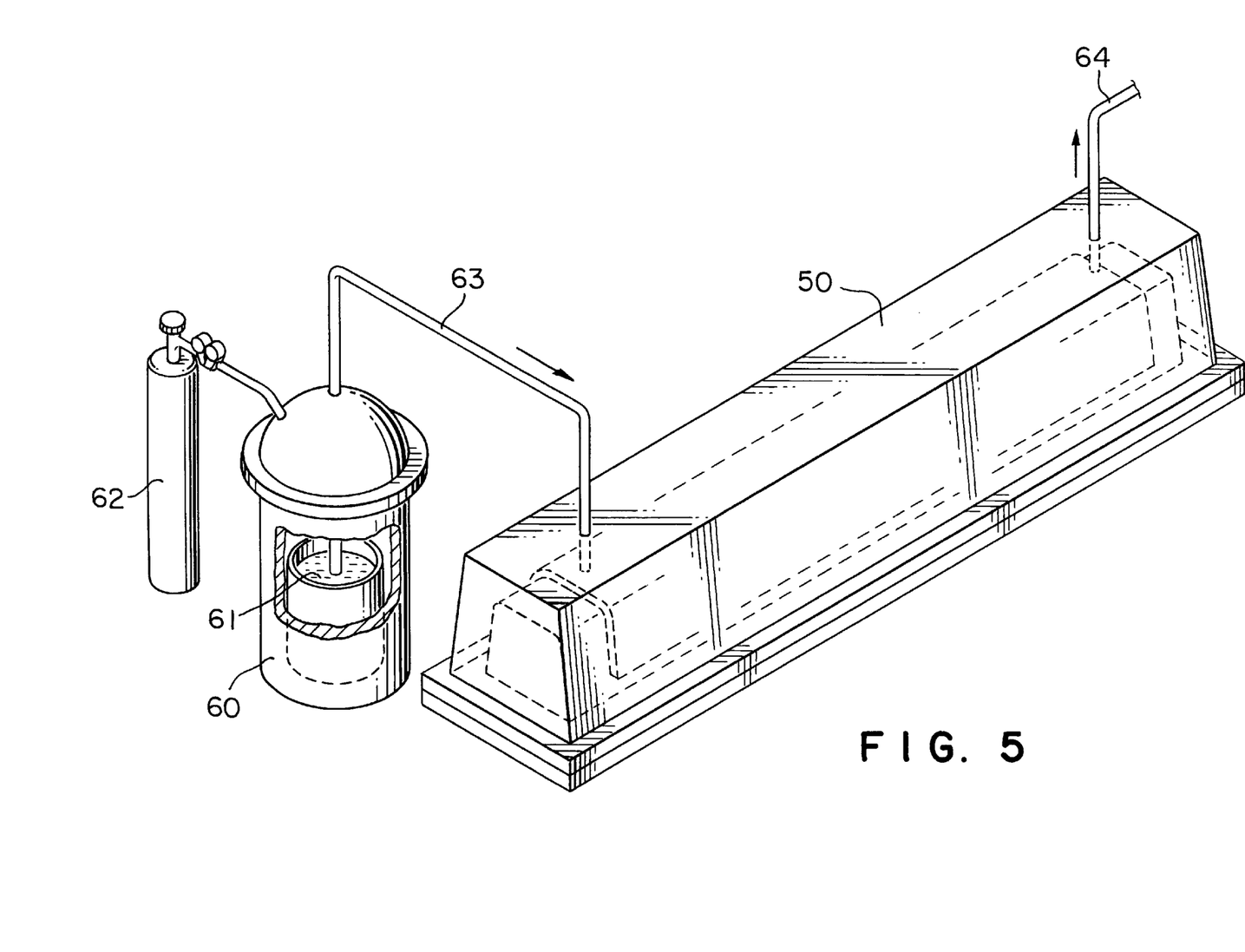
FIG. 5 is a perspective view of a composite article molding apparatus employing the mold in the first embodiment.

As shown in FIG. 5, a resin 61 contained in a pressure cylinder 60 is injected into the mold through a resin supply pipe 63 and an inlet port formed in the upper half mold 50 by the pressure of a high-pressure gas 62. The interior of the mold is evacuated through a suction pipe 64 connected to the upper half mold 50 to facilitate the spread of the resin 61 injected into the mold throughout the interior of the mold. The sealing member 12 prevents the leakage of the resin 61 from the interior of the mold to the outside, and the o rings 43 prevents the leakage of the resin 61 into the holes 41 (FIG. 3). After the interior of the mold has been filled up with the resin 61, the resin 61 starts flowing outside through the suction pipe 64. Then, the resin supply pipe 63 and the suction pipe 64 are removed from the mold, the mold is heated at an elevated temperature in a furnace or by an outside heater to harden the resin 61. After the resin 61 has hardened, the upper half mold 50 is separated from the lower half mold 10, the pressure plate 40 is removed, and the laminated sheet 30 impregnated with the resin 61 is trimmed to complete a composite article. If the mold is designed so that the thickness T (FIG. 4) of a space between the upper surface of the core 20 and the lower surface of the pressure plate 40 when the mold is closed is equal to the design thickness of the web part of the composite article, the composite article can be formed in a desired fiber volume percentage content Vf.

Figure 6:
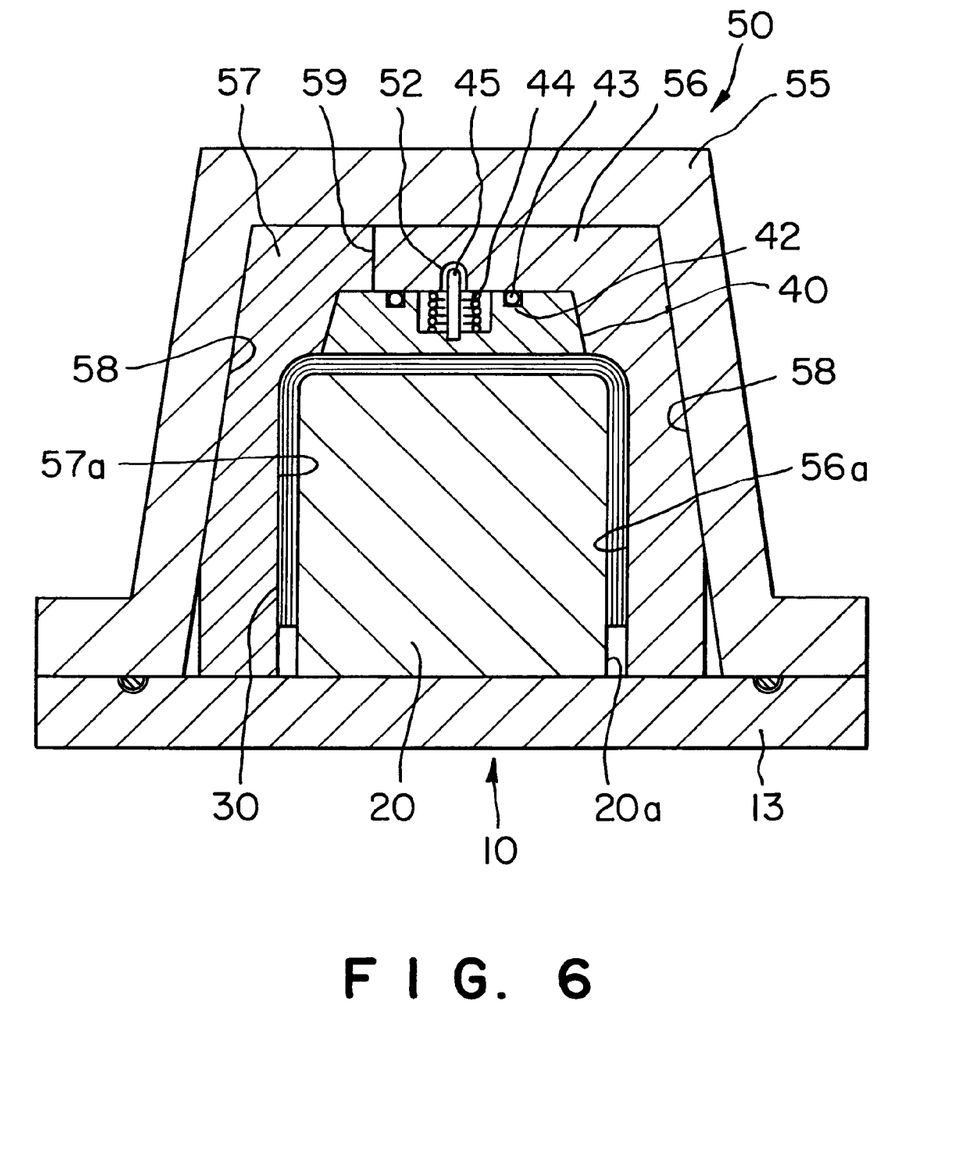
FIG. 6 is a cross-sectional view of a mold in a second embodiment according to the present invention in a closed state.

Referring to FIG. 6 showing a mold in a second embodiment according to the present invention, the mold is a composite mold comprising a lower half mold 10, a pressure plate 40, and an upper half mold 50. The lower half mold 10 has a base 13 and a core 20 having side surfaces 20a substantially perpendicular to the upper surface of the base 13. The upper half mold 50 is divided into an outer section 55 and inner section 56, 57 through a dividing interface. The inner section is divided above the pressure plate 40 into two inner parts 56, 57 and the two inner parts 56, 57 can be moved horizontally. The outer section 55 has an inner surface of a shape corresponding to the shape of the outer surface of the inner section 56, 57 as assembled. The outer section 55 has side walls 58 each having an inclined inner surface. The inner surface of the upper wall of the inner section 56, 57 comes into close contact with the upper surface of the pressure plate 40. The upper wall of the inner section 56, 57 is provided in its lower surface with recesses 52 corresponding to guide pins 45 attached to the pressure plate 40. The inner surfaces of the side walls of the inner section 56, 57 are shaped perpendicularly to the upper surface of the base 13 and corresponding to the side surfaces 20a of the core 20. Thus, spaces for forming flange parts substantially perpendicular to a web part are formed between the inner surfaces of the side walls of the inner section 56, 57 and the side surfaces 20a of the core 20 to shape the laminated sheet 30 in a predetermined shape resembling to a channel. The inner parts 56, 57 are joined into the inner section along a longitudinal interface 59 located at the one side of the endless grooves 42 formed in the upper surface of the pressure plate 40.

When impregnating the laminated sheet 30 with a resin in the mold, the laminated sheet 30 is placed on the upper surface of the core 20, and the pressure plate 40 is placed on the laminated sheet 30 to hold the laminated sheet 30 in place. A web part of the laminated sheet 30 is compressed firmly between the core 20 and the pressure plate 40 by the weight of the pressure plate 40 without being creased. Then, the inner section 56, 57 of the upper half mold 50 is placed on the base 13 so as to cover the pressure plate 40. Consequently, the laminated sheet 30 is bent in the shape of a channel along the core 20 by the inner section 56, 57 so that flange parts extend along the side surfaces of the core 20. At this stage, the flange parts of the laminated sheet 30 are pressed lightly against the side surfaces of the core 20 and are in a thickness greater than a predetermined thickness because the inner section 56, 57 is separated by the longitudinal interface 59. While, the springs 44 are compressed by the inner section 56 to make the pressure plate 40 press the web part of the laminated sheet 30 firmly against the upper surface of the core 20. Since the flange parts of the laminated sheet 30 are pressed lightly against the core 20 by the inner section 56, 57, the web part of the laminated sheet 30 is able to extend toward the flange parts when the same is compressed in a predetermined thickness without being creased. Then, the outer section 55 of the upper half mold 50 is fitted on the inner section 56, 57 to close the mold. The inclined side surfaces 58 of the outer section 55 engage with the inclined side surfaces 58 of the inner section 56, 57, so that the inner parts 56, 57 are pressed gradually toward the core 20 to press the flange parts of the laminated sheet 30 firmly against the core 20 by the wedge action of the outer section 55 as the outer section 55 is lowered. Thus the flange parts of the laminated sheet 30 are compressed into a predetermined thickness without being creased. Then, a resin is injected into the mold to impregnate the thus shaped laminated sheet 30 with the resin, the mold is heated at an elevated temperature in a furnace or by an outside heater to harden the resin, the mold is opened after the resin has hardened, and then the laminated sheet 30 thus shaped and impregnated with the resin is removed from the mold and trimmed to complete a composite article by a method similar to that previously described in connection with the first embodiment.

As is apparent from the foregoing description, the mold of the invention holds a top part of a laminated sheet in place on the core of the lower half mold with the pressure plate before side parts of the laminated sheet are pressed against the core by the upper half mold. Therefore, the laminated sheet can be compressed between the upper half mold and the lower half mold and can be satisfactorily shaped without being creased.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A resin transfer mold having a lower mold with a base and a core, and an upper mold for forming a laminated sheet into a predetermined shape in cooperation with said core, said resin transfer mold further comprising:
    a pressure plate, separate from said upper mold and said lower mold, to be placed on a laminated sheet to be placed on said core and having a flat lower surface for firmly pressing and holding said laminated sheet against an upper surface of said core by weight of said pressure plate without being creased; and
    said pressure plate having an elastic means placed in a hole in an upper surface of said pressure plate and extending between said pressure plate and an upper wall of said upper mold wherein, when said upper mold is lowered toward said core, said upper wall moves toward said pressure plate and compresses said elastic means by the weight of said upper mold for increasing a pressure to a part of said laminated sheet on said upper surface of said core before the side walls of said upper mold press flange parts of said laminated sheet firmly against side surfaces of said core such that said dart is able to extend toward said flange parts to thereby prevent said part from being creased.

2. A mold for molding a composite article comprising:
    a lower half mold having a base and a core mounted on the base;
    a pressure plate placed on a laminated woven fabric mounted on said core, having elastic means on an upper surface of the pressure plate for pressing a part of said laminated woven fabric against said core;
    an upper half mold capable of shaping said laminated woven fabric into a predetermined shape in cooperation with said core and said pressure plate by compressing said laminated woven fabric between said pressure plate and said core;
    said elastic means including a hole formed in the upper surface of the pressure plate, a guide pin inserted in said hole and protruding beyond said upper surface, and a spring inserted in said hole for surrounding said guide pin; and
    said upper half mold provided with a recess in a portion corresponding to said guide pin to receive said guide pin; and
    wherein said guide pin inserted in said recess for holding said pressure plate at a center position of said upper half mold while said upper half mold is closing for working operation.

3. A mold having a lower half mold with a base and a core mounted on said base and an upper half mold for molding a composite article, said mold further comprising:
    a pressure plate placed on a laminated woven fabric placed on said core, having elastic means on an upper surface of the pressure plate for pressing a part of said laminated woven fabric against said core, said pressure plate being separate from said upper half mold and said lower half mold;
    a pair of inner half upper molds, inserted inside of side walls of said upper mold half, for pressing flange portions of said laminated sheet at an inclined angle with respect to side surfaces of said core when said upper mold half is fitted on said pair of inner half upper molds;
    said upper half mold being capable of shaping said laminate woven fabric into a predetermined shape in cooperation with said core, said pressure plate and said pair of inner half upper molds by compressing said laminated woven fabric between said pressure plate, said pair of inner half upper molds, and said core; and
    said elastic means placed in a hole formed in said upper surface of said pressure plate and extending between said pressure plate and said pair of inner half upper molds wherein, when said upper mold half is fitted on said pair of inner half upper molds, said elastic means increases a pressure to said part of said laminated woven fabric.

4. A mold for molding a composite article comprising:
    a lower half mold having a base and core mounted on said base;

a pressure plate placed on a laminated woven fabric placed on said core, having elastic means on an upper surface of the pressure plate for pressing a part of said laminated woven fabric against said core;

an upper half mold capable of shaping said laminated woven fabric into a predetermined shape in cooperation with said core and said pressure plate by compressing said laminated woven fabric between said pressure plate and said core;

said elastic means including a hole formed in the upper surface of said pressure plate, a guide pin inserted in said hole and protruding beyond said upper surface, and a spring inserted in said hole for surrounding said guide pin;

said upper half mold comprising an outer section and an inner section divided from the outer section through a dividing interface, and said inner section is divided above said pressure plate; and said inner section being provided with a recess in a portion corresponding to said guide pin to receive said guide pin.

5. The mold according to claim 4, wherein:

said core has side surfaces perpendicular to an upper surface of said base, and said inner section of said upper half mold has an inner surface perpendicular to said upper surface of said base and corresponding to said side surface of said core, respectively.

* * * * *